Jan. 29, 1963 R. M. SHARP ET AL 3,075,559
DEFLECTOR FOR SOLIDS FLOWING IN A GASIFORM STREAM
Filed March 16, 1960
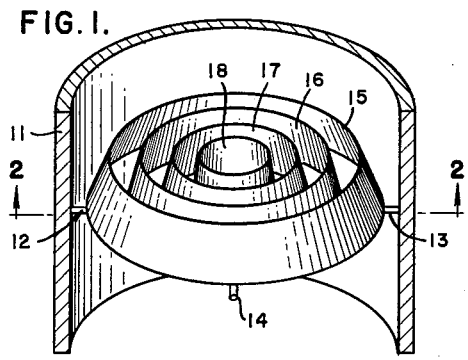
FIG. 1.
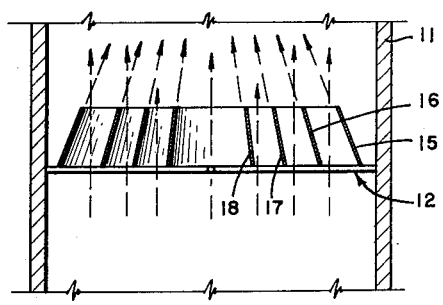
FIG. 2.
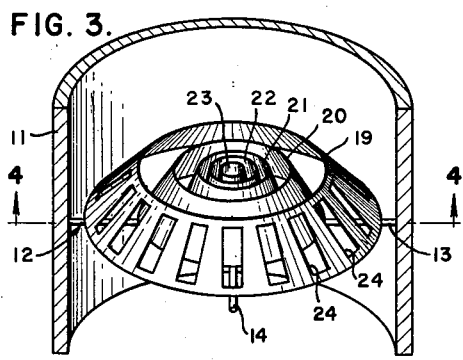
FIG. 3.
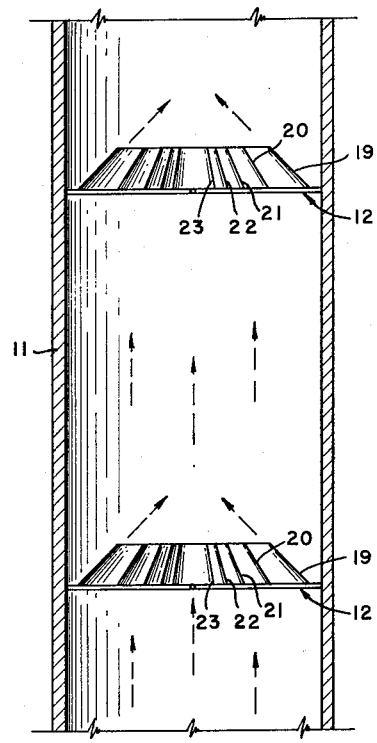
FIG. 4.
FIG. 5.
INVENTORS.
ROBERT M. SHARP,
IDE P. TROTTER, JR.,
BY
ATTORNEY.

3,075,559
DEFLECTOR FOR SOLIDS FLOWING IN A
GASIFORM STREAM
Robert M. Sharp, Baytown, Tex., and Ide P. Trotter, Jr., Fort McClellan, Ala., assignors, by mesne assignments, to Esso Research and Engineering Company, Elizabeth, N.J., a corporation of Delaware
Filed Mar. 16, 1960, Ser. No. 15,327
3 Claims. (Cl. 138—37)

The present invention is directed to apparatus for distributing solids flowing through a conduit. More particularly, the invention is concerned with apparatus for admixing solids flowing in a gasiform stream through an elongated conduit. In its more specific aspects, the invention is concerned with a fluidized system in which the solids are flowing in a gasiform suspension through a conduit and distributed therein.

The present invention may be briefly described as apparatus for distributing solids flowing through a conduit as a suspension in a gasiform fluid which comprises a plurality of concentric, conical frustrum segments. These segments are spaced apart concentrically and extend across the conduit and are supported in the conduit by means which may extend across the conduit.

The segments may be overlapping and at least the outer of the segments may be provided with horizontally spaced-apart rectangular openings extending around the periphery of the segments.

It is considered within the purview of this invention to provide a plurality of distribution means longitudinally spaced apart with each of the distribution means comprising a plurality of the concentric, conical frustrum segments spaced apart concentrically in the conduit and supported therein.

The present invention will be further described with reference to the drawing in which:

FIG. 1 is an isometric view in partial section of one embodiment;

FIG. 2 is a sectional view taken across the lines 2—2 of FIG. 1;

FIG. 3 is a partial sectional view of another embodiment of the present invention;

FIG. 4 is a view taken along the lines 4—4 of FIG. 3; and

FIG. 5 is a sectional view of a plurality of distribution means arranged in an elongated conduit.

Referring now to the drawing and particularly to FIGS. 1 and 2, numeral 11 designates a flow line such as a transfer line or a transfer line reaction zone of a fluidized system through which a gasiform suspension is flowing in the direction indicated by the arrows. Arranged in the conduit 11 on a supporting means 12 made up of cross-bars 13 and 14 which are attached to the inner wall of the conduit 11 is a plurality of concentric, conical frustrum segments 15, 16, 17, and 18. In the device of FIGS. 1 and 2, the conical segments do not overlap and some of the particles may pass straight through the distribution means as shown by the arrows. As will be clear from the drawing, the conduit 11 is of substantially uniform cross-sectional diameter and the segments have the bases thereof arranged to face in a direction opposite to the direction of flow of the suspension through the conduit 11.

Referring to FIGS. 3 and 4 in which a preferred form is illustrated, similar numerals will be employed to designate identical parts. In this embodiment a plurality of overlapping segments 19, 20, 21, 22, and 23 are arranged in the conduit 11 and supported therein on crossbars 13 and 14 as shown in the drawing. At least the outer segment 19 is provided with a plurality of horizontally spaced-apart rectangular openings 24 which extend around the surface of the segment 19. The segments 20, 21, 22 and 23 may also be provided with rectangular openings such as 24, but these slots may be so arranged that they are not immediately under the rectangular openings 24 in the segment 19. However, they may be arranged under the rectangular openings 24 as may be desired.

Referring to FIG. 5, a plurality of the distribution means such as illustrated in FIGS. 3 and 4 made up of segments 19, 20, 21, 22, and 23 are arranged in the elongated conduit 11 such that the flow of solids through the conduit 11 may be distributed and redistributed therein as indicated by the arrows.

The device of the present invention is applicable to a fluidized solids system such as a catalytic cracking system employing the fluidized solids technique in which the solids are suspended in a vaporous or gasiform medium such as vaporized hydrocarbons and contacted with the solids in the suspension to cause catalytic conversion such as catalytic cracking of the vaporized hydrocarbon. The solids may be suspended in the vaporous medium to provide a bulk density in the range from about 1 to about 55 pounds per cubic feet. The gasiform suspension may flow through the conduit 11 at a velocity within the range from about 5 to about 100 feet per second and the suspension may be at a temperature in the range from about 650° to about 1100° F. and under a pressure in the range from about 5 to 75 pounds per square inch gauge.

In cracking of hydrocarbons where grid devices have been used in fluidized systems to effect distribution of the solids in the suspension, the grids have usually been composed of bar grids, of round bars placed side by side in layers with each layer having its bars rotated 90° to its adjacent layers to form a screen-like pattern. These grids are concerned with redistribution of high density solid regions flowing through the conduit which are generally close to the wall of the conduit. When one of the high density regions or streams of solids contacts the grid, the average particle striking a bar thereof is diverted 45° from its previous direction of flow. This redistribution occurs equally to either side of the round bar and thus half of the dispersal action occurs in a direction to the wall of the conduit or opposite to the desired direction. Also, the dispersal is limited to 45° from the line of flow anywhere in the line cross section and within the streamer of solids. Thus, the interference of the 45° components as they pass through the grid limits the effectiveness of this type of device.

The device of the present invention consisting of a series of concentric, conical frustrum segments supported from the pipe wall as illustrated in the drawing overcomes the disadvantages of the conventional grid and has major advantages and utility thereover. In the present invention all of the redistribution occurs toward the center of the conduit in the direction from maximum dispersal with none of the solids being sent to the conduit wall. This specific direction is also superior to the action of rectangular bar grids which depend on random impact for dispersal. Again, the redirection of the device of the present invention may be made a variable function of the radius. Thus, the device of the present invention is not limited to 45° dispersal because of the outermost conical segments may be slanted to divert the solids at the wall more sharply to the center of the pipe than the particles flowing closer to the middle, as shown more clearly in FIGS. 3 and 4. It will be apparent that the outer segments slant toward the center of the conduit at a lesser angle with the diameter of the conduit than the inner segments. Additionally, there is much less interference between redirected streamers of solids than in the bar grid device, thus making the dispersal more efficient than in the conventional device. There is less interference of the streamer components of the solids in the present invention than in the prior art device and thus the present invention redistributes the solids at a lower consumption of energy, which means less of a pressure drop through the conduit.

In the device illustrated in the several figures of the drawing, referring particularly to FIGS. 1 and 2, the conical segments are not overlapping and thus some of the particles pass straight through the grid but in doing so interfere with some of the redirected particles. In the device of FIGS. 3 and 4 where overlapping slotted conical segments are provided, some of the particles pass through with no redirection or interference while the remainder of the particles are diverted with no interference with the straight-through particles.

While the present invention has been illustrated by 4 and 5 conical segments, it is within the spirit and scope of the invention that any number of conical segments may be used. Also, it is contemplated that any number of distribution means may be employed in a conduit such as 11, although only two of such distribution means have been shown in FIG. 5. It is contemplated that by virtue of the low consumption of energy, a large number of distribution means may be employed, for example, in the transfer line reaction zone of a catalytic cracking unit.

The nature and objects of the present invention having been completely described and illustrated, what we wish to claim as new and useful and secure by Letters Patent is:

1. Apparatus for distributing solids which consists of a conduit of substantially uniform cross-sectional diameter adapted for flowing a suspension of solids in a gasiform fluid therethrough, a plurality of concentric conical frustrum segments spaced apart concentrically and extending across the diameter of said conduit, at least the outer of said segments slanting toward the center of said conduit at a lesser angle with the diameter of said conduit than the inner of said segments, and means supporting said segments in said conduit, the bases of said conical segments being arranged to face in a direction opposite to the direction of flow of said suspension.

2. Apparatus in accordance with claim 1 in which the segments overlap each other.

3. Apparatus for distributing solids which consists of a conduit of substantially uniform cross-sectional diameter adapted for flowing a suspension of solids in a gasiform fluid therethrough, a plurality of concentric conical frustrum overlapping segments spaced apart concentrically in and extending across the diameter of said conduit, at least the outer of said segments slanting toward the center of said conduit at a lesser angle with the diameter of said conduit than the inner of said segments, at least the outer of said overlapping segments being provided with horizontally spaced-apart rectangular openings, and means supporting said segments in said conduit, the bases of said conical segments being arranged to face in a direction opposite to the direction of flow of said suspension.

References Cited in the file of this patent

UNITED STATES PATENTS

| | | |
|---|---|---|
| 646,378 | Szamatolski | Mar. 27, 1900 |
| 1,298,315 | Evans | Mar. 25, 1919 |
| 1,612,930 | Lochen | Jan. 4, 1927 |
| 2,581,134 | Odell | Jan. 1, 1952 |
| 2,608,968 | Moseley | Sept. 2, 1952 |
| 2,611,685 | Yoder | Sept. 23, 1952 |
| 2,946,345 | Weltman | July 26, 1960 |